United States Patent Office 3,462,001
Patented Aug. 19, 1969

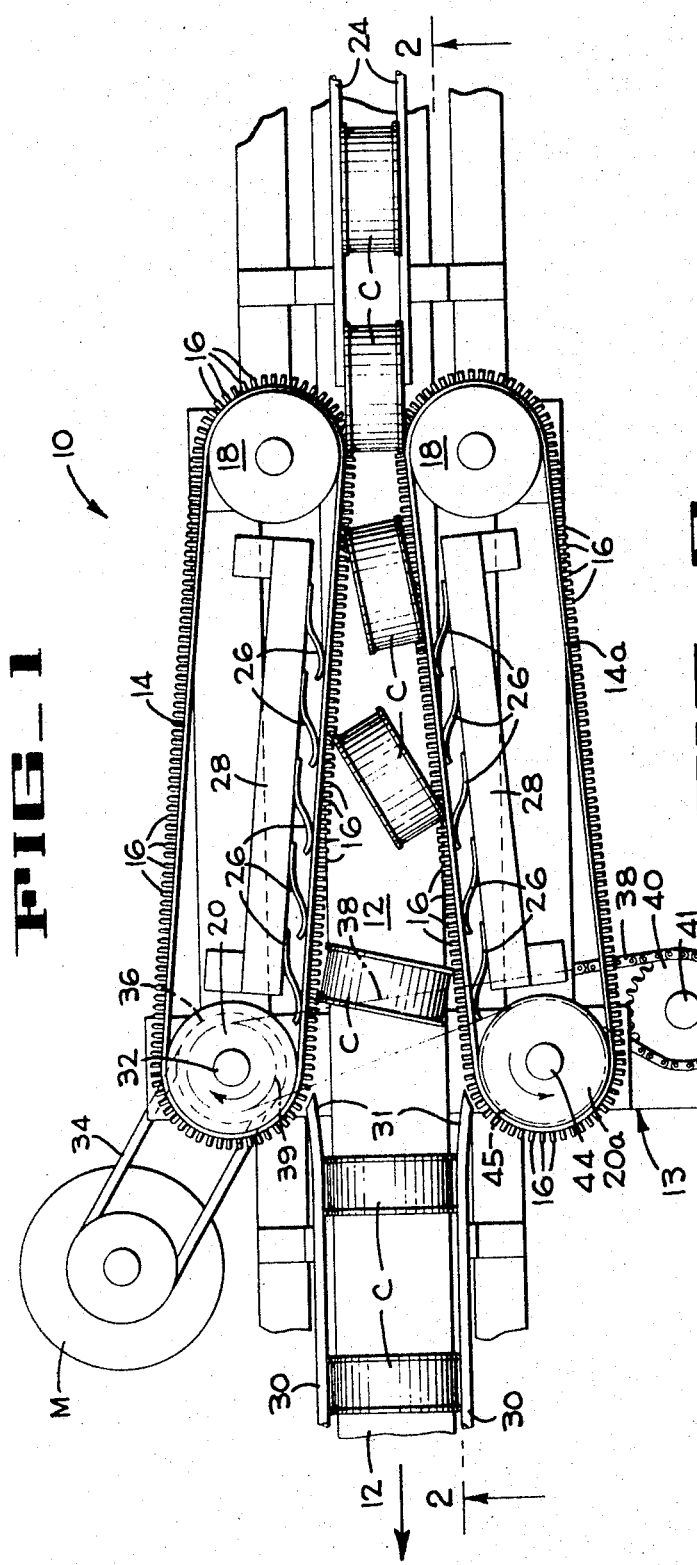
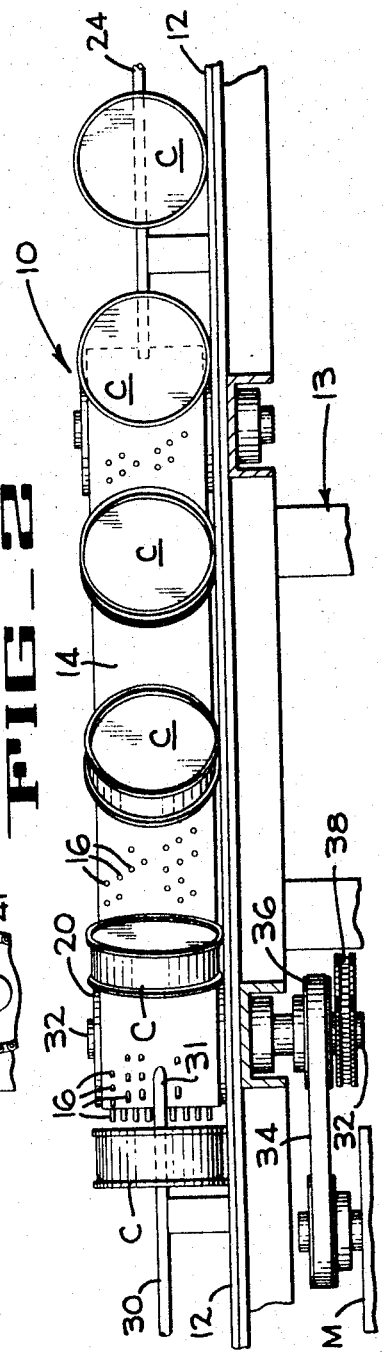
INVENTOR
JOHN BOYCE
BY
Francis W. Anderson
ATTORNEY

3,462,001
CONTAINER ORIENTING APPARATUS
John Boyce, San Jose, Calif., assignor to FMC Corporation, San Jose, Calif., a corporation of Delaware
Filed May 26, 1967, Ser. No. 641,576
Int. Cl. B65g 47/24, 15/16
U.S. Cl. 198—33      3 Claims

ABSTRACT OF THE DISCLOSURE

An apparatus for turning a series of spaced cylindrical containers which are resting on their cylindrical surfaces through 90° in a horizontal plane. The apparatus includes a conveyor belt for carrying the containers and a pair of belts between which the containers are arranged to pass with their side edges being gripped by the belts, one of said belts being driven at a faster speed than the other so as to effect the turning of each container about a vertical axis.

BACKGROUND OF THE INVENTION

Field of invention

In general, this invention pertains to that field of art concerned with the movement of a series of articles upon conveyors, and more particularly, it concerns the mechanisms for changing the orientation of said articles as they are being conveyed. In the present case, the invention is concerned with the orienting of containers by turning them through an angular movement of substantially 90° with respect to their conveyor.

Description of the prior art

In the handling of cans during commercial processing it is frequently necessary to change the orientation of the cans as they are being rapidly moved by a transporting conveyor. For example, in processing cans in the conventional hydrostatic cooking apparatus, it is necessary that the cans be placed in rows, or sticks, in an end-to-end relationship for transport through the apparatus. Conveyors moving the cans to and from the cookers usually carry the cans in an upright position. It is therefore necessary that mechanisms be provided which can rapidly orient a can from an upright position to a position with its longitudinal axis parallel to its direction of movement, and from the latter position back to the upright position with the longitudinal axis at right angles with its direction of movement. The most difficult portion of this orientation movement is to transfer the cans from the flat or rolling position to the end-to-end position and vice versa, maneuvers which require the rotation of the cans through 90° about a transverse axis.

Huppenthal Patent 3,312,326, Apr. 4, 1967 re-orients jars by supporting them on a horizontal conveyor while engaging their tops with a conveyor moving at a different speed. Carter Patent 2,825,442, Mar. 4, 1958 spots bottles for labeling by rotating them with side conveyors while they slide over a plate.

SUMMARY OF THE INVENTION

In general, the present invention comprises a pair of conveying surfaces driven at different speeds between which a series of cans are arranged to be transported. The conveying surfaces, due to the difference in their linear speeds, grip the edges of the cans and cause the cans to be rotated about their transverse axes. The conveying surfaces, which in the present case are provided by opposed endless belts, are of a particular length and are set at an angle to one another so that the cans will be turned through an angle of exactly 90°. The device of the present invention, with a reversal of the driving means, is capable of orienting a series of cylindrical containers, for example, either from the flat rolling position to the end-to-end position or vice versa.

It is the primary object of the present invention to provide device which is capable of operation at can line processing speeds of from 900 to 1000 cams per minute.

Another object of the present invention is to provide a can orienting device capable of gently handling the cans as they are rotated, a requirement that becomes extremely important at the high operating speeds of present commercial can processing lines.

BRIEF DESCRIPTION OF THE DRAWING

FIGURE 1 is a plan view of the container orienting apparatus of the present invention depicting its operation upon a series of spaced containers.

FIGURE 2 is a vertical section taken along line 2—2 of FIGURE 1.

DESCRIPTION OF THE PREFERRED EMBODIMENT

The container orienting apparatus 10 of the present invention in the preferred embodiment is designed to rotate a series of spaced cylindrical cans C through 90° as they are transported upon a flat belt, substantially horizontal surface feeder conveyor 12. The conveyor, which is supported upon a frame section 13, is arranged between successive can processing stations, not shown, in a can processing line and is driven by conventional means, also not shown. The cans are rotated from positions with their longitudinal axes transverse to the conveyor belt, as shown at the right in the plan view of FIGURE 1, to positions with their longitudinal axes parallel to the conveyor belt, as shown at the left of FIGURE 1. In the preferred embodiment, the operation of the apparatus will be described whereby the cans are rotated as they are moved from right to left in FIGURE 1 although it will be recognized that movement and rotation of the cans in the opposite direction is also possible if the directions of movement of the conveyor and can handling apparatus, to be described, are reversed.

The apparatus for turning the containers comprises two endless orienting belts 14 and 14a which are rotatably mounted in upright and opposed positions on opposite sides and slightly above the conveyor belt 12 and which have a plurality of resilient fingers 16 projecting from their outer surfaces. A pair of rollers 18 are rotatably mounted upon the frame 13, each roller serving to support one of the belts at the inlet end of the orienting structure 10. A pair of drive rollers 20 and 20a, also mounted upon the frame 13, support the belts at the outlet end of the structure. It can be seen that the drive rollers 20 and 20a are spaced further apart than the rollers 18 so that the belts diverge in the downstream direction.

At the inlet end of the apparatus, the cans C are carried on the conveyor belt 12 in flat positions with their longitudinal axes lying transversely to the direction of movement and are directed between spaced guide rails 24 and into a position between the rollers 18 where the edges or chimes of the cans at the sides of conveyor belt 12 are gripped by the resilient fingers 16 of the belts 14 and 14a. By means to be described hereinafter, one belt 14 is driven at a slightly faster rate of speed than the other belt 14a. This causes the trailing edge of the can to be picked up by the belt 14 and moved faster than the leading edge of the can which is picked up by the belt 14a. Consequently, the can is caused to rotate about a vertical axis as it is advanced by the belts. In the described embodiment of the invention, the speed of the belts 14 and 14a is such that little or no longitudinal movement of the can occurs with respect to the underlying conveyor belt 12. In other words, the linear speed of the belt 14 is slightly faster than that of the supporting belt 12, and the linear speed of the belt 14a is slightly less than that of belt 12 so as to achieve the proper rotational movement of the cans without altering the spacing of their centers upon the belt 12. However, the speeds of the belts 14 and 14a may be faster than that of belt 12 if desired. Under such conditions the cans would be propelled forwardly with respect to the underlying belt 12 during the time that they are received between the belts 14 and 14a. Such an arrangement would be of practical use, for example, when it is desired to space a string of unspaced cans at the inlet end of the orienting apparatus.

In FIGURE 1, a series of cans are shown undergoing their rotational movement. It will be appreciated that the conveyor belts are arranged at particular angles with respect to the conveyor belt in accordance with dimensions of the cans so that the cans will be turned exactly 90° when the effects of the belts 14 and 14a are removed therefrom.

A plurality of leaf springs 26 are mounted upon each of two rigid backing members 28 affixed to the frame 13 and are used to yieldingly support the flat operating surfaces of the belts upon which the cans are turned. These springs are arranged to yield somewhat to allow for the change in transverse dimension of the cans to permit free turning movement of the cans without binding, but they should be fairly stiff so that the belts do not yield so much as to cause a particular can to adversely affect the movement of the trailing or preceding can.

At the outlet end of the can orienting apparatus, the cans are received between a pair of guide rails 30 that are mounted upon the frame 13 at opposite sides of the conveyor belt 12 and have their leading ends 31 curved so as to mate with the discharge ends of the belts 14 and 14a and prevent the cans from becoming disoriented from their proper rotational positions.

The drive rollers 20 and 20a are driven by a motor M which is connected by means of a drive belt 34 and pulley 36 to a drive shaft 32 that rotatably mounts the drive roller 20 upon the frame structure 13. Drive shaft 32 also drives an endless chain 38 by means of a sprocket 39 affixed thereto. The chain 38 is trained about an idler sprocket 40 rotatably mounted by a stub shaft 41 at a position outside of the opposing drive roller 20a. Drive roller 20a is supported upon the frame 13 by a stub shaft 44 which also mounts a sprocket 45. The teeth of the sprocket 45 are arranged to be engaged by the driven chain 38 to rotate the roller 20a in the opposite direction from that of roller 20. The sizes of the aforedescribed sprockets and pulleys are such that the proper speed differential between the belt 14 and 14a is achieved.

The gripping belts 14 and 14a are preferably formed of rubber with the projecting fingers 16 extending about one-half inch from the flat face of the belt to assure a firm grip upon the edges of the cans. Other frictional belting materials may be substituted if desired, however, provided they have sufficient frictional gripping power to prevent slippage while the cans are being rotated. For example, sponge rubber faced belts might be substituted in some installations.

It will be obvious that the cans C can be rotated in the oposite direction when the drive means for the rollers 20 and 20a is reversed and the direction of movement of the conveyor belt 12 is likewise reversed. It will also be obvious that the device of the present invention can be arranged to rotate a container through any amount of angular movement by simply adjusting the relative speeds of the gripping belts 14 and 14a and adjusting the convergence or divergence of the belts accordingly. Furthermore, varying sizes and shapes of cylindrical containers as well as other shapes and forms of containers, may be accommodated by the present invention by adjusting the angular relationship of the belts 14 and 14a to permit continuous gripping of the containers as their transverse dimensions with respect to conveyor belt 12 are changing.

It is important, of course, that the proper speed differential be maintained between the belts 14 and 14a so that the containers will be gently rotated to their new positions upon the transporting conveyor 12. While both belts 14 and 14a may be driven faster than the transport conveyor, the slower of the two belts 14a should be driven at a speed at least fast enough to prevent the belt 12 from moving out from under the cans C as they are rotated and possibly affecting their orientation.

Having completed a detailed description of the invention so that those skilled in the art could practice the same, I claim:

1. Container orienting apparatus comprising a feeder conveyor having a substantially horizontal conveying surface, opposed endless orienting belts on opposite sides of said feeder conveyor having stubstantially vertical, laterally yieldable reaches for engaging opposite sides of containers resting on said feeder conveyor, the container engaging reaches of said orienting belts forming an angle that accommodates 90° turning of the containers on said feeder conveyor, said feeder conveyor extending past both ends of said orienting belts, means for driving said feeder conveyor, and means for driving the container engaging reaches of said orienting belts in the same direction as that of said feeder conveyor surface but at different linear speeds, at least one of said orienting belts having a linear speed that is higher than that of said feeder conveyor.

2. The apparatus of claim 1, wherein the other of said orienting belts has a linear speed that is lower than that of said feeder conveyor by the same amount that the speed of said one orienting belt is higher than that of said feeder conveyor, for orienting the containers without moving them relative to said feeder conveyor.

3. The apparatus of claim 1, wherein the linear speeds of both orienting belts exceed that of said feeder conveyor for increasing the spacing of containers along said feeder conveyor while orienting the containers.

References Cited

UNITED STATES PATENTS

| | | | |
|---|---|---|---|
| 1,991,652 | 2/1935 | Bean | 198—165 X |
| 2,825,442 | 3/1958 | Carter | 198—33 |
| 3,312,326 | 4/1967 | Huppenthal | 198—165 X |

EDWARD A. SROKA, Primary Examiner

U.S. Cl. X.R.

198—165